Dec. 13, 1938.                J. MAINA                2,140,085
                    COMBUSTION PRODUCTS POWER PLANT
                         Filed Dec. 7, 1934
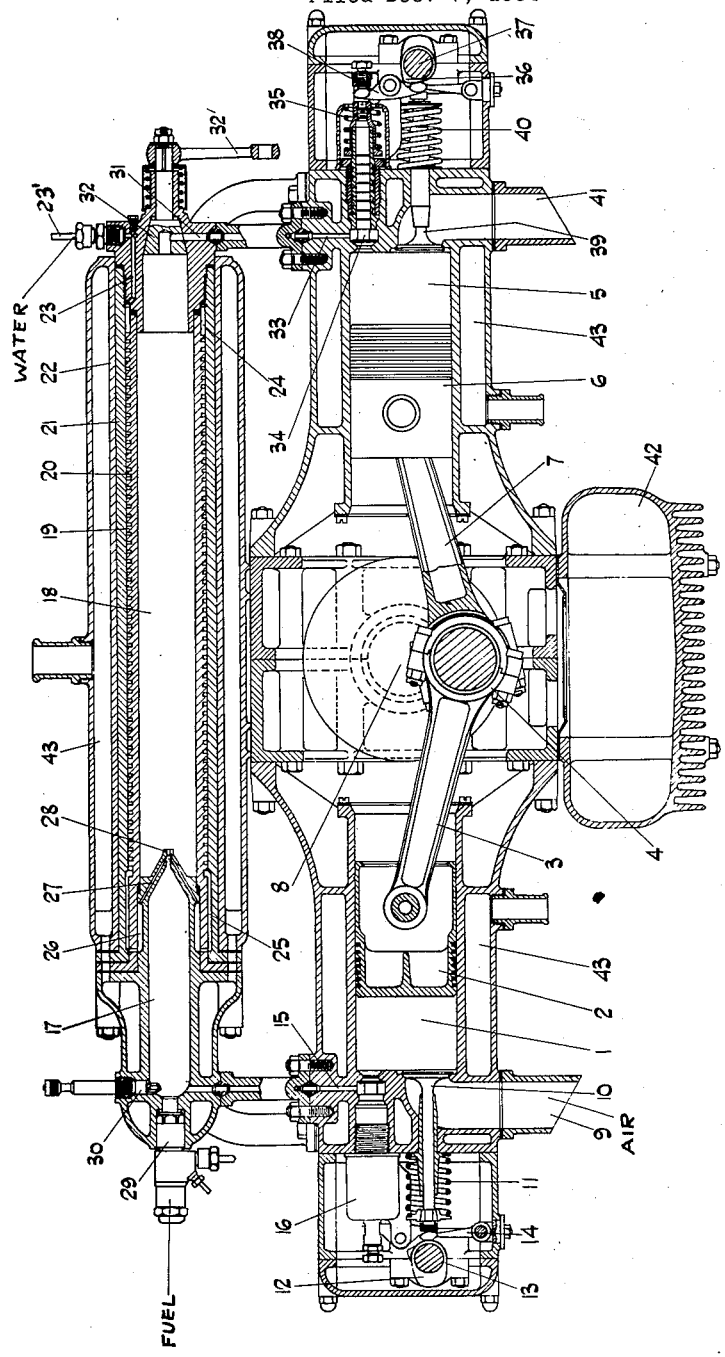
INVENTOR:
JOSEPH MAINA
BY Francis E. Boyce
ATTORNEY Patented Dec. 13, 1938

2,140,085

UNITED STATES PATENT OFFICE 2,140,085

COMBUSTION-PRODUCTS POWER PLANT

Joseph Maina, London, England, assignor to The Williams Rotary Engines Company Limited, Auckland, New Zealand Application December 7, 1934, Serial No. 756,382
In Great Britain November 8, 1934

1 Claim. (Cl. 60—45)

This invention relates to power plants of the type using a working fluid consisting of combustion-products obtained by igniting a liquid fuel in highly compressed air, with the injection of water or steam, in which the combustion takes place in a combustion chamber separate from the engine itself. The invention has for its object an improved engine of this type.

According to the present invention I provide a combustion product reciprocating engine of the type described, comprising at least one power piston and one compressor piston connected to one same crank of the crank shaft, there being as many compressor pistons as power pistons, and a pressure generator formed of two parts: a pre-combustion chamber in which the compressed air is first admitted and in which the fuel is injected and a main combustion chamber proper into which the resulting mixture of combustion gases proceeds by way of a Venturi-shaped nozzle adapted to inject into the said combustion chamber, by passages opening into the throat of the venturi, in the same direction as that in which the hot gases are moving, and in which the fuel was injected, water or steam from a vaporizing coil provided in the wall of the said combustion chamber.

In the preferred arrangement of engine according to the invention, the engine is a multi-cylinder engine having the same number of compression cylinders as there are power cylinders, the compressor and power cylinders being disposed in parts and being so positioned that they are in alignment on either side of the crank, with the two piston rods connected to the same crank, there being but one pressure generator for the whole engine, which pressure generator is disposed in a direction parallel to the axes of the cylinders, that is to say, transversely of the crank shaft. The pressure generator is constituted by a cylindrical gas bottle in the external surface of the wall of which is provided a helical square thread of small pitch, the said bottle being inserted with force fit into a hollow cylindrical member constituting a liner, round which is a third cylindrical member constituting a cooling jacket, the said helical thread forming, in the known manner, a vaporizing coil for the water, or a superheater for the steam, to be injected in the hot gases within the pressure generator. By connecting the power and the compressor pistons on the same crank, torsional and bending stresses in the crank shaft are minimized.

By this construction, the length of the passages from a combustion chamber to the cylinders of the engine which it is to supply with heated gases, is made as short as possible, and, consequently, loss of heat of the hot gaseous mixture during its transfer from the said combustion chamber to the said cylinder is reduced to a minimum.

Referring to the drawing left herewith, which represents as an example a particular construction of an engine according to the invention:

The single figure of the drawing is a mid-transverse section of the engine, through a compressor-power pair of cylinders, showing the pressure generator, which is perpendicular to the crank shaft, also in section, for the purpose of clearness.

In the engine shown, 1 is the compressor cylinder, 2 is the compressor piston, 3 the compressor connecting rod, connected to the crank 4; 5 is the power cylinder opposed to the compressor cylinder 1, 6 is the power piston and 7 is its connecting rod, articulated on a common centre on the same crank 4. The two connecting rods of the pair of opposed compressor and engine cylinders are therefore connected to the same crank on the crank shaft 8, the two cylinders being in alignment on either side of this shaft.

Atmospheric air is admitted to the compressor cylinder 1 by the air intake 9, through a valve 10 which opens inwardly against the action of a spring 11, the said valve 10 being positively operated by a cam 12 on a cam shaft 13, by the intermediary of a rocker 14, in the known manner. From the cylinder 1 of the compressor, the compressed hot air proceeds by way of a passage 15, controlled by a valve 16, through the pre-combustion chamber 17 of the pressure generator, and thence to the main combustion chamber 18, consisting of a cylindrical gas bottle 19, disposed parallel to the cylinders, on the outer surface of which is cut a thread 20, the bottle being inserted with a force fit into the lining 21 of a hollow cylindrical jacket 22. The thread 20 constitutes a vaporizing coil for water, forced into it by way of the inlet 23 and 23′, the annular passage 24, and issuing from it at the other end into the annular passages 25 and 26, whence passages 27 lead it to the nozzle 28.

A fuel injection nozzle 29, at the compressor end, enables fuel to the injected into the pre-combustion chamber 17; a heating coil 30 being provided in this pre-combustion chamber for starting purposes.

The heated mixture air-fuel-steam, issuing from the nozzle 28 into the main combustion chamber 18, proceeds by way of the passage 31, controlled by the valve 32 and lever 32', and is admitted by the passage 33, to the power cylinder 5. The admission passage 33 is controlled by the valve 34, opening outwardly against the action of the spring 35 operated by the cam 36 on the cam shaft 37, through the intermediary of the rocker 38; the same cam shaft operates the exhaust valve 39, which opens inwardly against the action of the spring 40, allowing the expanded and spent gases to escape by the axhaust 41. 42 is the sump of the engine, 43 is the engine cooling jacket.

The figure represents one unit of the engine, there being a number of such units side by side, either with alternative power and compressor cylinders on one side of the crank shaft, or with the compressor cylinders all on one side, or arranged in any other manner as may be desired. If desired, more than one pressure generator may be provided.

It will be seen that there is one pressure generator for all the pairs of compressor-power cylinders, placed perpendicularly to the crank shaft.

What I claim and desire to secure by Letters Patent is:—

In a compression ignition combustion-product reciprocating engine, a crankshaft having at least one crank, a pair of pistons comprising one power piston and one compressor piston connected to each crank, there being as many pairs of pistons as there are cranks, a pair of horizontal opposed cylinders for each pair of pistons, the cylinder receiving the compressor piston being on one side of the crankshaft and the cylinder receiving the power piston being on the opposite side of the crankshaft, an elongated combustion-products-forming device positioned immediately adjacent said cylinders, said device comprising a pre-combustion chamber and a coaxial elongated main combustion chamber, means for conducting a charge of hot highly compressed air from the compressor cylinder into said pre-combustion chamber, means for introducing fuel into the charge of air in said pre-combustion chamber, a nozzle, coaxial with and connecting said chambers, for leading the mixture from the pre-combustion chamber into the main combustion chamber, means formed in the wall of said main chamber for heating water to generate steam, conduits formed in the wall of the nozzle for leading the steam into the gases passing through the nozzle, and means for conveying gases formed in the pressure generator to a power cylinder, the arrangement being such that very short passages are provided for the flow of highly compressed air from the compressor cylinder to the pre-combustion chamber and for the flow of the actuating fluid from the main combustion chamber to the power cylinder.

JOSEPH MAINA.